United States Patent [19]
Laude-Bousquet

[11] Patent Number: 5,475,982
[45] Date of Patent: Dec. 19, 1995

[54] METHOD FOR STORING A COOLANT FLUID IN MELTING EQUILIBRIUM

[75] Inventor: Adrien Laude-Bousquet, Anse, France

[73] Assignee: Thermique Generale et Vinicole, France

[21] Appl. No.: 260,987

[22] Filed: Jun. 15, 1994

[30] Foreign Application Priority Data

Jun. 21, 1993 [FR] France ................. 93 07724

[51] Int. Cl.$^6$ ............................ F25D 3/00
[52] U.S. Cl. ................ 62/59; 62/76; 62/118
[58] Field of Search ............ 62/59, 118, 76, 62/77, 139

[56] References Cited

U.S. PATENT DOCUMENTS

| | | |
|---|---|---|
| 2,101,953 | 12/1937 | Oman . |
| 4,294,310 | 10/1981 | Reusch et al. . |
| 4,365,662 | 12/1982 | Reusch et al. . |
| 4,509,344 | 4/1985 | Ludwigsen et al. . |
| 4,584,843 | 4/1986 | Pronger, Jr. et al. . |
| 4,643,212 | 2/1987 | Rothrock . |
| 5,195,850 | 3/1993 | Davis et al. . |
| 5,307,642 | 5/1994 | Dean ........................... 62/59 |
| 5,348,080 | 9/1994 | Kuroda et al. ................ 62/59 |

FOREIGN PATENT DOCUMENTS

| | | |
|---|---|---|
| 0427648 | 5/1991 | European Pat. Off. . |
| 2125172 | 9/1972 | France . |
| 2408803 | 6/1979 | France . |
| 2454599 | 11/1980 | France . |
| 9110982 | 12/1991 | Germany . |

Primary Examiner—John M. Sollecito
Attorney, Agent, or Firm—Oliff & Berridge

[57] ABSTRACT

Method for storing a coolant fluid comprising two phases of one and the same substance in melting equilibrium, according to which an enclosure for storing said fluid is used in which the coolant fluid stored settles into a lower liquid layer and an upper solid layer, the coolant fluid to be stored is introduced into the enclosure at the level of the lower layer, and the coolant fluid to be removed from storage is extracted from the enclosure at the level of the upper layer, wherein, in combination, on the one hand, a gaseous headspace is set up between the upper layer and the upper wall of the enclosure and, on the other hand, the coolant fluid to be removed from storage is extracted, from a withdrawal zone located at the level of the interface between the upper layer and the gaseous headspace, through a vertical flow by generating a vortex.

6 Claims, 3 Drawing Sheets

METHOD FOR STORING A COOLANT FLUID IN MELTING EQUILIBRIUM

BACKGROUND OF THE INVENTION

The present invention relates to the storage of a coolant fluid comprising two phases of one and the same substance in melting equilibrium, for example water to which an antifreeze agent such as salt, alcohol, ethylene glycol or propylene glycol is added. This substance in melting equilibrium may also be an eutectic. The coolant fluids considered according to the invention are then obtained, transported and used in diphasic form (liquid phase plus solid phase), in particular in a homogenous consistency close to that of water-ice.

DESCRIPTION OF THE PRIOR ART

According to document EP-A-0 427 648, a device has already been described, in general, for extracting heat from a plurality of enclosures to be cooled, comprising an intermediate circulation circuit or loop for a coolant fluid as defined previously, a heat exchange means between the coolant fluid and a refrigerant fluid, and, associated with each enclosure to be cooled, a branch circuit comprising a heat exchanger arranged in the enclosure to be cooled, the inlet and the outlet of which communicate with the intermediate circulation circuit.

Still in accordance with this same document, a thermally isolated "buffer" container is connected onto the intermediate circulation circuit, for generating and storing the coolant fluid in the diphasic state, and in melting equilibrium, in which the proportion of solid phase depends on the refrigeration power consumed in the intermediate circulation loop and/or on the refrigeration power delivered by the refrigerant fluid. This container includes, on the one hand, a means for introducing the coolant fluid to be stored, at a level located at the lower part of said container and, on the other hand, a means for extracting the coolant fluid to be removed from storage, at a level located in height at the upper part of said container, said introduction and extraction means each communicating with the intermediate circulation circuit of the coolant fluid. More precisely, the extraction means is equipped with an endless screw for supplying the coolant fluid in the homogenous diphasic state, on the intake side of the pump of the intermediate circulation circuit of the coolant fluid; and the means for extracting the coolant fluid communicates with the intermediate circuit, upstream of the junction between the introduction means and the intermediate circuit. A diphasic recycling and cooling circuit for the coolant fluid is associated with this storage container, and comprises a withdrawal point in the lower part of said container, a point of introduction of the recycled and cooled fluid, in the upper part of said container, and a recycling means such as a pump. A refrigeration unit in which a refrigerant fluid circulates is associated with this recycling circuit, with a heat exchanger provided between the recycled coolant fluid and the refrigerant fluid which, for example, undergoes vaporization; this heat exchanger is, for example, a scraped-surface exchanger or a special multi-tube exchanger, allowing supercooling of the coolant fluid.

In operation, in the enclosure defined by the storage container of the coolant fluid stored, the latter settles into a lower, relatively liquid layer, and an upper, relatively solid layer having the consistency of snow. The coolant fluid occupies the entire volume available in the enclosure. The coolant fluid to be stored is introduced, from the intermediate circulation circuit, at the level of the lower layer of the coolant fluid stored; and the coolant fluid to be removed from storage is extracted from the enclosure, at the level of the upper layer, using the endless screw provided on the extraction means. So as, on the one hand, to maintain turbulence between the two phases of the coolant fluid, promoting homogenization and, on the other hand, to cool the latter continuously, the coolant fluid contained in the storage enclosure is recycled, by withdrawing said fluid at the level of its relatively liquid lower layer and by reintroducing it at the level of the upper, relatively solid layer into the enclosure, this being done while cooling the recycled fluid between its withdrawal point and its reintroduction point.

According to document U.S. Pat. No. 2,101,953 a method has been described for storing a coolant fluid, in this case brine, which differs from the method previously defined with reference to the operation of a device according to document EP-A-0 427 648, in that, on the one hand, a gaseous headspace is set up between the relatively solid upper layer of the coolant fluid stored and the upper wall of the storage enclosure, and on the other hand, the coolant fluid to be removed from storage is extracted from a withdrawal zone located in the said storage enclosure at the level of the interface between the aforementioned upper layer and the gaseous headspace.

According to documents U.S. Pat. Nos. 4,509,344 and 4,584,843, a device has been described, in the context of a complete refrigeration installation, for storing a coolant fluid, for example brine, including:

- a thermally isolated storage container, in the form of a tank or a silo, forming a storage enclosure for the coolant fluid in diphasic form;
- a means for introducing the coolant fluid to be stored, at the upper part of the container, in the form of a boom distributing the coolant fluid in diphasic form;
- and a means for extracting the coolant fluid to be removed from storage, only in the liquid phase, at the lower part of the container.

The operation of such a storage device is as follows:

- in the thermally isolated storage enclosure, the coolant fluid stored settles into a lower, relatively liquid layer, and an upper, relatively solid layer;
- the coolant fluid to be stored, in diphasic form, and consequently previously cooled, is introduced and distributed above the relatively solid upper layer;
- and the coolant fluid to be removed from storage is extracted from the enclosure, only in liquid form, at the level of the lower layer of said fluid.

Such heat extraction systems make it possible to convey a very high refrigeration power, with a relatively low flow rate, by virtue of the use of the latent heat of fusion of the coolant fluid. For example, with a coolant fluid whose solid phase constitutes 30% by weight and with an intermediate circuit having a cross section with diameter equal to 90 mm, it is possible to provide a refrigeration power of 960.000 calories/hour with a flow rate of 40 m$^3$/hour.

The association of a storage container or enclosure of the coolant fluid with the intermediate circulation circuit of the latter makes it possible to limit the size of the intermediate circuit, and in particular of the refrigeration unit, using the following working conditions;

at night, and in particular by making use of the so-called "cheap rate" electricity consumption tariff, the coolant fluid subsequently used during the day can be generated and stored the refrigerant fluid stored makes it possible to smooth the peak refrigeration power consumption which occurs for example for a few hours during one and the same day, or during particularly hot or full activity periods.

This being the case, storage of the coolant fluid in the storage container or enclosure raises certain problems, linked with its separation, as described previously, into a relatively liquid lower layer and a relatively solid upper layer, floating at the surface of the lower layer in some manner.

By pumping the upper layer, by the means for extracting the coolant fluid to be removed from storage, the latter is obtained essentially in liquid phase. In fact, the solid phase tends to agglomerate in the form of a compact snow, and the liquid phase creates preferential passages in the mass thus formed, so that it is only this that is withdrawn.

According to document U.S. Pat. No. 5,195,850, a method has been described for transporting a particulate solid phase of a coolant fluid in melting equilibrium, in a descending vertical liquid stream of the liquid phase of the coolant fluid, arriving at the bottom and within the storage enclosure of a coolant fluid in diphasic form.

According to this method, in a pouring cone, the solid phase introduced tangentially is entrained by a jet of the liquid phase which is also introduced tangentially, together forming a vortex held in the descending vertical stream from the pouring cone to its outlet at the bottom and within the enclosure.

Such a method is ill-suited for a coolant fluid stored in diphasic form and extracted in this form, because it only makes it possible to introduce a diphasic fluid into an enclosure, by vortex mixing of its liquid and solid phases, at the moment of said introduction.

SUMMARY OF THE INVENTION

The subject of the invention is a method or device for storing a coolant fluid, making it possible for the latter to be extracted in simple manner, in a homogenous and unagglomerated diphasic form which can be pumped directly like a pure liquid phase.

The present invention results from the discovery according to which, in practice, the diphasic coolant fluid has a thixotropic behavior, which means that this fluid normally behaves in a relatively viscous or compact form in the absence of agitation, and in a relatively fluid form when agitated or in movement.

The devices according to the invention apply this discovery according to the following provisions.

A cone for pouring out the coolant fluid stored is made, within the enclosure and at the level of the withdrawal zone and the cross section of which decreases downward. And an ascending or descending vertical flow of the fluid to be removed from storage is formed, starting from the pouring cone, while generating, only by interaction of the vertical flow with respect to the pouring cone, agitation in the coolant fluid extracted over at least a part of the said vertical flow.

Such a method may, in particular, be implemented by a storage device having, in combination, the following technical features:

a gas source is assocated with the container, for setting up a gaseous headspace at the upper part of the container
and the extraction means of the diphasic coolant fluid is arranged vertically inside the container, and comprises a vertical pipe ending in a pouring cone for the coolant fluid.

By virtue of the invention, withdrawal of the coolant fluid in homogenous diphasic form is ensured by the combination of the two following functions:

the gaseous headspace makes it possible to isolate the solid phase from the upper part of the container, while eliminating any compacting due to the compression of this same phase at the top of the container the flow with agitation or turbulence of the coolant fluid taken out and removed from storage fluidizes the latter as this withdrawal progresses, actually at the drawing-off location.

BRIEF DESCRIPTION OF THE DRAWINGS

The present invention is now described with reference to the attached drawing, in which.

DESCRIPTION OF THE PREFERRED EMBODIMENTS

Figure 1:
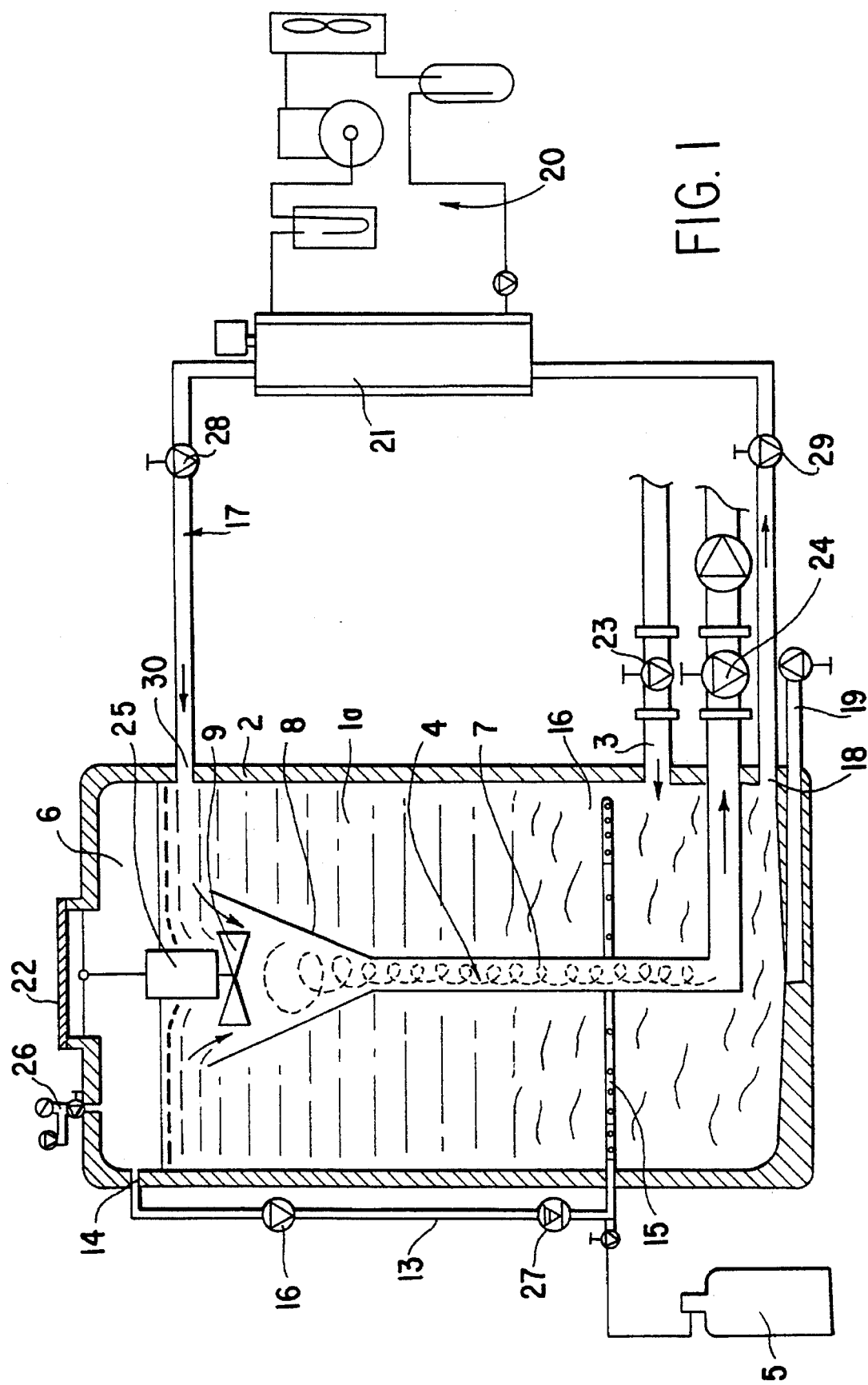
FIG. 1 represents a first embodiment of the invention, in schematic form

In accordance with FIG. 1, a storage device according to the invention comprises:

a thermally isolated container 2 for storing the coolant fluid 1, forming a storage enclosure of the latter; this container is optionally equipped at its upper part with an access door 22 a means 3 for introducing the coolant fluid to be stored, coming from the intermediate circulation circuit of the coolant fluid; this means consists of a simple take-off at the lower part of the container 2, controlled by a valve 23 a means 4 for extracting the coolant fluid to be removed from storage, by downward descent, arranged vertically inside the container 2 and comprising a vertical pipe 7 controlled by an outlet valve 24, ending at the upper part in a cone 8 in the form of a funnel for pouring the coolant fluid; optionally an agitation means 9, in the form of paddles, actuated by a motor 25 is arranged and acts inside the pouring cone 8 a gas source 5 associated with the container 2, via a gas recycling circuit 13; the latter comprises a take-off point 14 at the upper part of the container 2, an injection means 15 in the form of a perforated boom, directing the recycled atmosphere toward the walls of the container 2 at the lower part of the latter, and a means 16 for circulating the recycled gaseous atmosphere between the take-off point 14 and the injection means 15, the gas source 5 in the form of a bottle of an inert pressurized gas, being connected onto the recycling circuit downstream of the circulation means 16; the injection of the recycled gaseous atmosphere may take place at various levels of the container 2, depending on the solid-phase concentration of the diphasic fluid according to height various elements for controlling the gas circulation, comprising, on the one hand, in the upper part of the container 2, a take-off 26 controlled by a valve in conjunction with a manometer and a safety valve and, on the other hand, a non-return valve 27, provided on the recyclying circuit 13, preventing any return of liquid and/or solid phase into the container 2 a diphasic recycling circuit 17 for the coolant fluid, comprising a withdrawal point 18 in the lower part of the container, and a means 30 for tangential reintroduction of the recycled fluid, which means can generate a vortex in the upper layer 1a and is located in the upper part of the container, away from the withdrawal point 18; this recycling circuit is controlled by valves 28 and 29 a refrigeration unit 20 associated with the storage container 2, in which a refrigerant fluid circulates with a scraped-surface heat exchanger 21 between the recycled coolant fluid and the refrigerant fluid a pipe 19 for draining the container 2.

Figure 2:
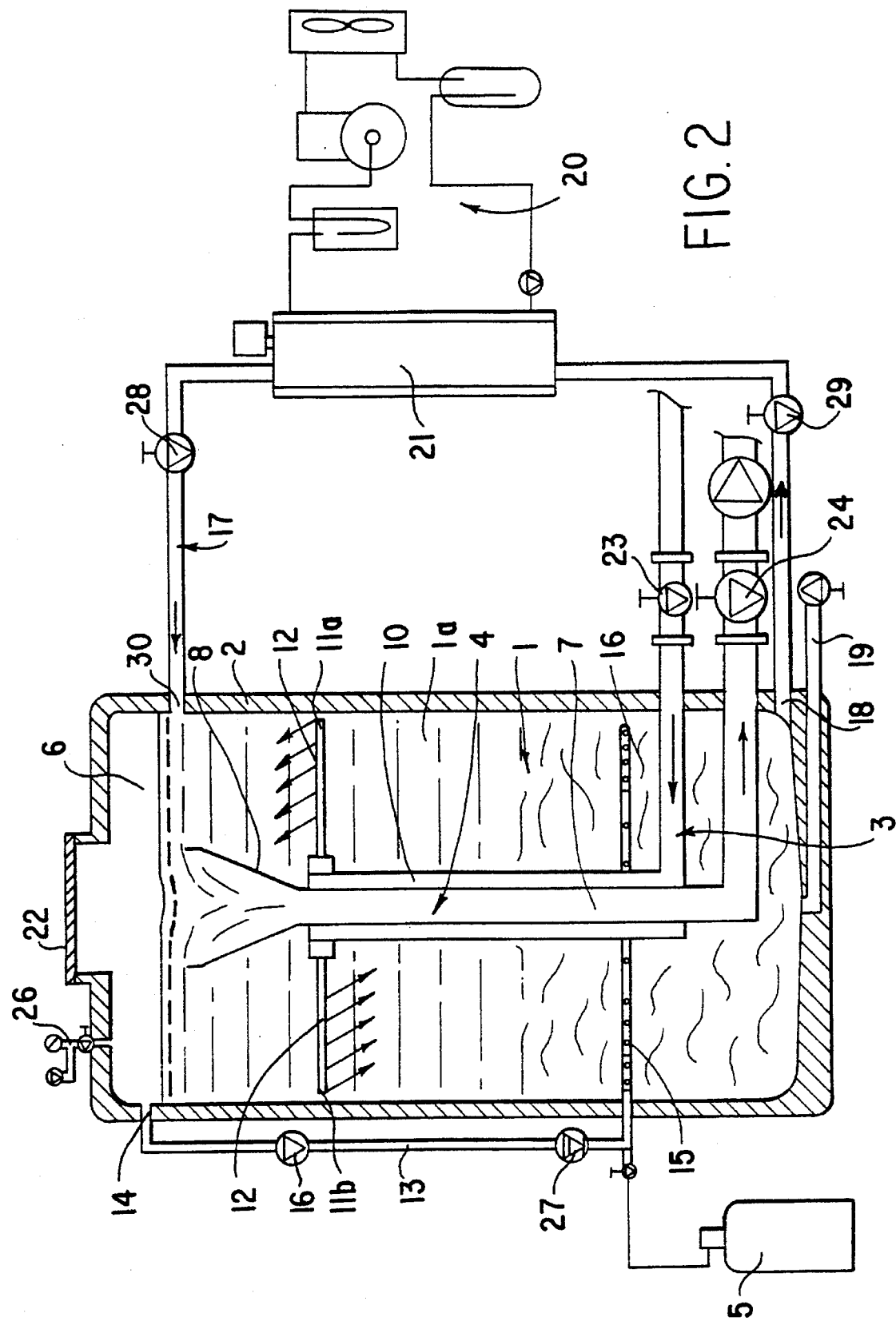
FIG. 2 represents a second embodiment of the invention, still in schematic form

The device represented in FIG. 2, according to a second embodiment of the invention, differs from the first in that the introduction means 3 for the coolant fluid comprises a vertical pipe 10 concentric with the vertical pipe 7 for extracting the coolant fluid, and ends at the upper part of the container 2 in a means 11 for ejecting the coolant fluid introduced. More precisely, this ejection means 11 consists of two aligned booms 11a and 11b, turning about one and the same vertical axis corresponding to the pipes 7 and 10, and each provided with a plurality of nozzles 12 for ejection in a horizontal and/or vertical direction. The senses of ejection of the booms 11a and 11b are respectively opposite, so as to generate rotation of the said booms, at the moment of introduction of the coolant fluid into the container 2.

By virtue of the devices described respectively with reference to FIGS. 1 and 2, in operation:

in the container 2 forming a storage enclosure, the coolant fluid stored settles into a lower, relatively liquid layer 1b and an upper, relatively solid layer 1a the coolant fluid to be stored is introduced, either at the lower part of the container (cf. FIG. 1), or at the centre and in the upper part (cf. FIG. 2), after having directed it vertically, with agitation and stirring of the upper, relatively solid layer, by virtue of the rotation of the boom 11a–11b and the action of the horizontal and/or vertical jets of the coolant fluid by the combined action of the gas source 5 and the gas recycling circuit 13, a gaseous headspace 6 is set up between the upper layer 1a and the upper wall of the enclosure 2 the coolant fluid to be removed from storage is extracted from the enclosure, at the level of the upper layer 1a, at the level of the interface between the upper layer 1a and the gaseous headspace 6; the pouring cone 8 of the coolant fluid stored therefore lies within the storage enclosure 2 in a withdrawal zone at the level of the aforementioned interface, with its cross section decreasing downward; and an ascending or descending vertical flow of the fluid to be removed from storage is formed in the pipe 7, starting from the cone 8, while generating, only by interaction of the vertical flow with respect to the cone 8, agitation or turbulence in the coolant fluid extracted, over at least a part of the flow, that is to say of the pipe 7.

According to the embodiment specific to FIG. 2, the coolant fluid is introduced into an inlet zone located in the storage enclosure, at the level of the upper layer 1a, by an ascending vertical flow in the pipe 10 following the introduction in the lower part of the container 2 and ending in a distribution 11 of the coolant fluid in a plurality of jets.

On the one hand, the gaseous atmosphere present in the gaseous headspace 6 in the storage enclosure 2 is continuously recycled at a level located in height at least at the level of the lower layer 1b and on the other hand the coolant fluid withdrawn at the level of the lower layer 1b is continuously recycled into the storage enclosure 2 by reintroducing it into the enclosure 2 at the level of the upper layer 1a according to FIG. 1, and tangentially. These two recycling arrangements are capable of developing and maintaining a turbulent or agitated state within the storage enclosure.

Obviously, the size of the pouring cone 8 and of the vertical pipe 7 is calculated and determined so as to make it possible to convey the homogenous diphasic fluid with sufficient speed, without blockage or obstruction.

The stirring or turbulence sustained in the container 2, both because of the recycling of the coolant fluid and that of the gaseous atmosphere, and also because of the siting and the mode of introduction of these latter, have the effect of raising a part of the liquid phase to the surface and dislocating the solid phase, especially at the periphery of the reservoir.

In the event of obstruction of the storage container, the direct connection of the pressurized gas source 5 onto the container, by the introduction means 15, makes it possible to create a strong overpressure, which can dislocate the compact solid phase in order to allow new stirring and rising of the liquid phase.

Figure 3:
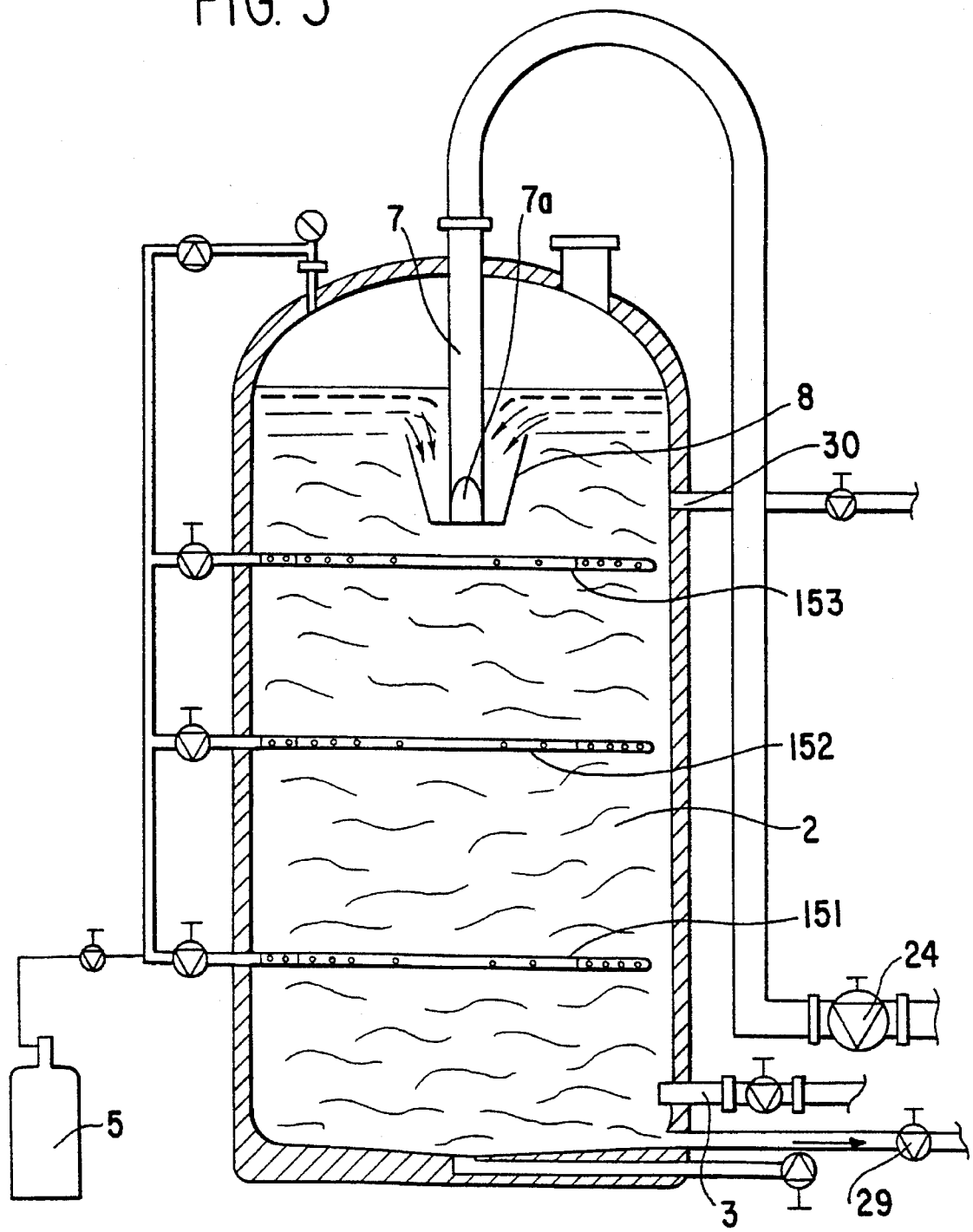
FIG. 3 represents, according to a third embodiment of the invention, the storage container belonging to a device according to the invention.

According to FIG. 3, the coolant fluid is extracted at the top part of the tank 2, by upward suction in conjunction with a pouring cone 8 suspended from the end of the vertical pipe 7. This end communicates via openings 7a with the interior of the cone 8.

According to FIG. 3, the gaseous atmosphere is recycled by three injection booms 151 to 153, staged along the height of the container 2.

I claim:

1. A method for storing a coolant fluid comprising two phases of one and the same substance in melting equilibrium, according to which:

a thermally isolated enclosure for storing said fluid is used, in which the coolant fluid stored settles into a lower, relatively liquid, layer and an upper, relatively solid, layer the coolant fluid to be stored is introduced into the enclosure at the level of the lower, relatively liquid layer the coolant fluid to be removed from storage is extracted from the enclosure at the level of the upper layer a gaseous headspace is set up between the upper layer and the upper wall of the enclosure and the coolant fluid to be removed from storage is extracted from a withdrawal zone located in the storage enclosure at the level of the interface between the upper layer and the gaseous headspace wherein a cone for pouring out the coolant fluid stored is made, within the enclosure and at the level of the withdrawal zone and the cross section of which decreases downward, and an ascending or descending vertical flow of the fluid to be removed from storage is formed, starting from the pouring cone, while generating, only by interaction of the vertical flow with respect to the pouring cone, agitation in the coolant fluid extracted over at least a part of the said flow.

2. The method as claimed in claim 1, wherein the coolant fluid to be removed from storage is extracted by at least one of the following vertical flow modes, namely upward suction and downward descent of said fluid.

3. The method as claimed in claim 2, wherein after having introduced the coolant fluid to be stored in the enclosure, this fluid is directed vertically and it is distributed in a plurality of horizontally and/or vertically directed jets.

4. The method as claimed in claim 1, wherein the gaseous atmosphere present in the gaseous headspace is recycled into the storage enclosure, at least at the level of the lower layer.

5. The method as claimed in claim 1, wherein the gaseous atmosphere present in the gaseous headspace is recycled into the storage enclosure, on several staged levels in the enclosure.

6. The method as claimed in claim 1, wherein the coolant fluid is recycled into the storage enclosure and, for this purpose, said fluid is withdrawn at the level of the lower layer, the fluid withdrawn is cooled outside the enclosure, and the cooled coolant fluid is reintroduced into the storage enclosure at the level of the upper layer.

* * * * *